United States Patent Office 3,511,966
Patented May 12, 1970

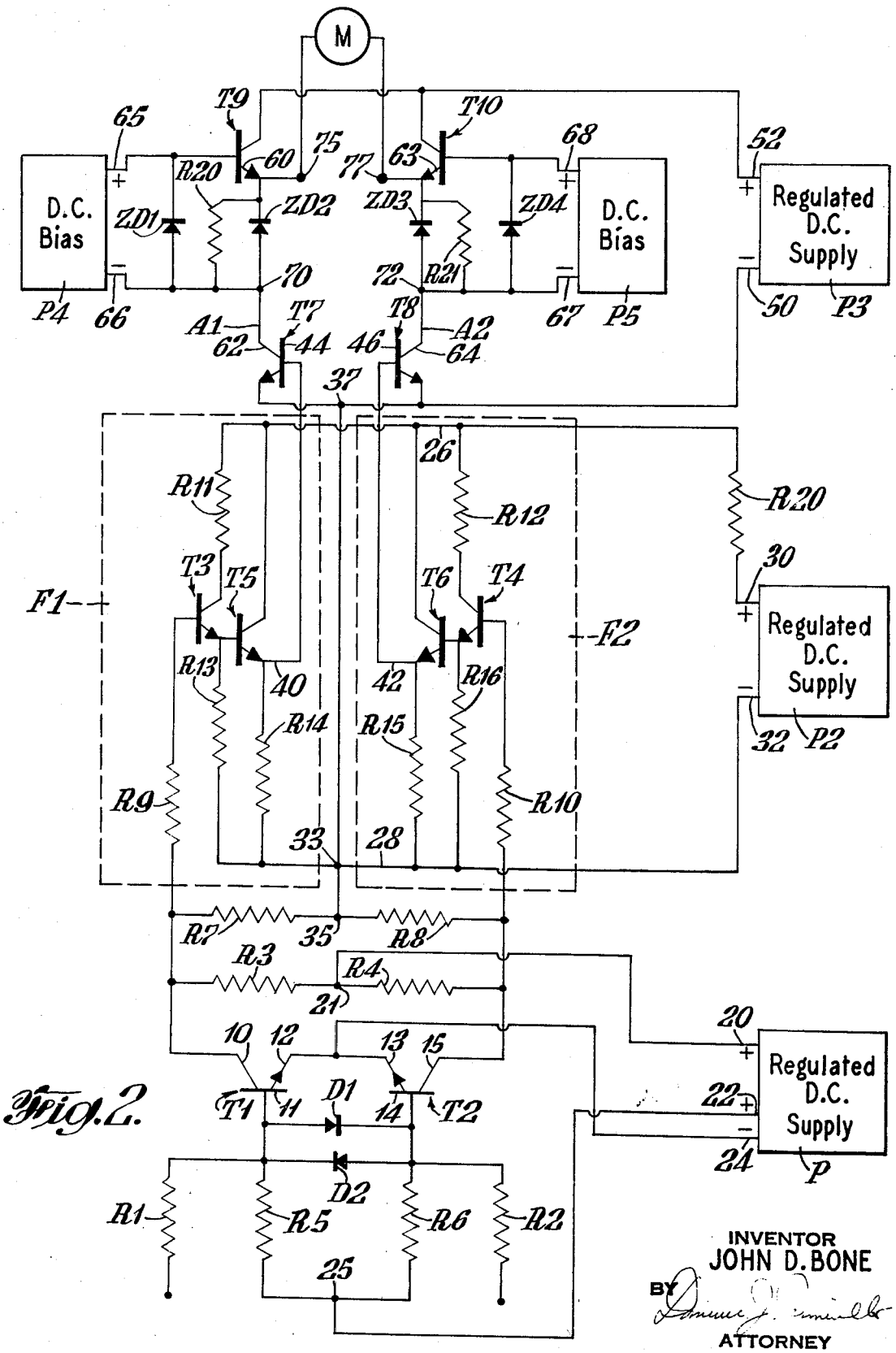

3,511,966
ARC WELDING CONTROL APPARATUS
John D. Bone, Matawan, N.J., assignor to Union Carbide Corporation, a corporation of New York
Filed Apr. 13, 1967, Ser. No. 630,557
Int. Cl. B23k 9/10
U.S. Cl. 219—131                    4 Claims

ABSTRACT OF THE DISCLOSURE

A transistorized arc welding control system which comprises a balanced bridge network for instantaneously reversing the direction of current to a load circuit including a D.C. servo motor in response to input signal polarity reversals. The load circuit is connected across the arms of the bridge network and the direction of current is controlled therethrough by the current flow in either base leg of the bridge network.

---

This invention relates to arc welding control apparatus for maintaining predetermined welding conditions and more particularly to a transistor control circuit for improving the overall performance of the control apparatus.

Where weld quality and reliability are paramount and must meet rigid standards as in the aerospace field the welding operation is usually mechanized. In conjunction with mechanized welding equipment, control apparatus is employed to regulate and monitor the weld action. The control apparatus operates to continuously compare a fixed reference signal representing a predetermined welding condition with a variable signal representing the actual welding condition to be controlled. The difference signal or error signal is fed to a control circuit which includes means for adjusting the level of the variable signal to the level of the reference signal to reduce the error signal to zero.

A control circuit employing a pair of thyratrons or silicon controlled rectifiers in combination with a D.C. servo motor to control the error signal has been in use in the past. When an error signal is present, the polarity of the error signal controls the firing of one or the other of the two thyratrons. The fired thyraton controls a current source for supplying current to the D.C. motor, rotating it in a direction to provide a feedback signal to reduce the error signal. The error signal represents a deviation from a desired welding condition such as arc voltage or current. The output signal derived from the arc has associated therewith some ripple or spurious noise pulses which if sensed as a deviation will result in an erroneous error signal. These noise pulses are of short time duration but may have relatively large magnitudes. Accordingly, the noise pulses must be suppressed or the control circuit rendered insensitive thereto. To filter the erratic noise pulses would introduce undesirable time delay decreasing substantially the response time of the control circuit. To overcome the need for filtering, the thyratron control circuit responds only to relatively large error signals and therefore possesses a low sensitivity. Sensitivity is defined for purposes of this disclosure as the degree to which the control circuit will respond to a given error signal. With low sensitivity large error signals are required to cause a corrective response. An attempted increase in the sensitivity of the thyratron control circuit increases the tendency of oscillation resulting in physical damage to the motor.

In the present invention, a transistorized control has been developed which includes a differential amplifier and a balanced bridge network. The transistorized control is substantially unaffected by randomly produced spurious noise pulses and possesses a remarkably high sensitivity. The balanced bridge network of the transistorized control drives a load circuit which may comprise, for example, a D.C. servo motor. The bridge network acts to reverse the current direction in the load circuit with changes in the polarity of the amplifier output. The polarity of the output of the differential amplifier depends upon the polarity of the error signal applied thereto. The magnitude of the load current is proportional to the magnitude of the error signal. The transistorized control will respond to an error voltage as low as .005 volt without any tendency to cause oscillation.

A typical use of this invention would include arc voltage control for TIG welding although not limited thereto. The transistor control provides an output to the D.C. servo motor in the load circuit. The drive shaft of the servo motor is coupled to the torch head through a gearing arrangement for continually adjusting the electrode to work distance so that the arc voltage is maintained at the level of the reference voltage. The reference voltage is taken from an adjustable regulated reference voltage supply source and adjusted to a predetermined welding voltage output. The error voltage supplied to the transistor control is the difference between the reference voltage and the arc voltage taken directly across the welding arc.

It is the principal object of this invention to provide control apparatus for maintaining a predetermined welding condition.

It is a further object to provide a transistor control with improved sensitivity characteristics and minimal tendency to cause oscillation.

In the drawings:

FIG. 2 is the circuit diagram of the transistor control circuit of FIG. 1.

Figure 1:
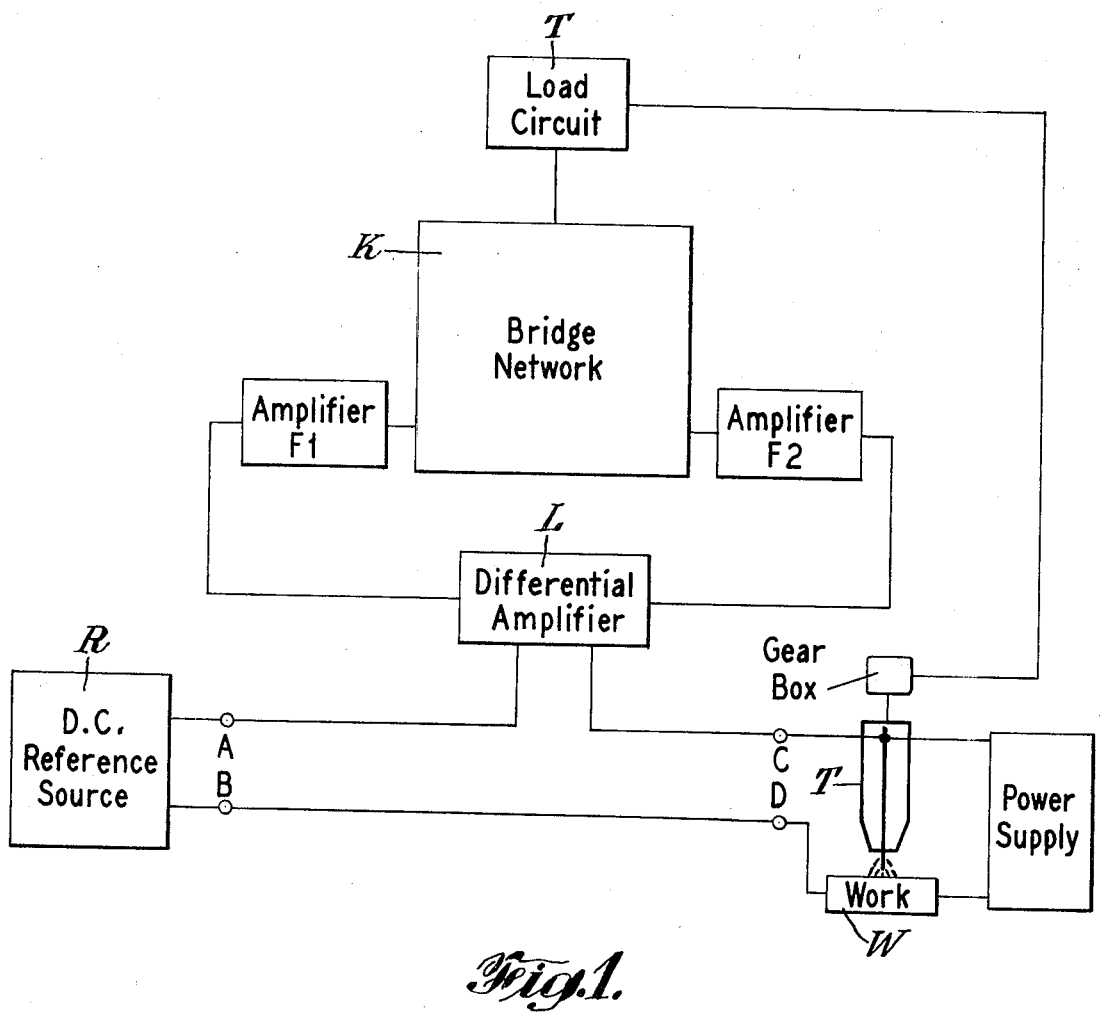
FIG. 1 is a block diagram illustrating the invention.

Referring to FIGS. 1 and 2, an error signal is applied to the differential amplifier L of the transistor control circuit. The error signal is the difference between the reference voltage at terminals A and B and a variable voltage appearing at terminals C and D. The variable voltage may signify the arc voltage, arc current, wire stick out or arc length depending upon which is to be controlled. Assuming arc voltage is to be maintained constant, the variable voltage will be taken from across the arc. The D.C. reference source R is adjusted to some predetermined voltage making the error signal measured from terminals A and C positive or negative depending upon whether the arc voltage is smaller or greater than the reference voltage when compared therewith. The polarity of the error signal will determine the polarity of the output of the differential amplifier L. This output is applied to the bridge network K through amplifiers F1 and F2 to control the direction of current flow to load circuit T.

The error voltage appearing at terminals A and C of FIG. 1 is fed into differential amplifier L through limiting resistors R1 and R2 respectively (see FIG. 2). The differential amplifier L includes a matched pair of semiconductor silicon transistors T1 and T2. Transistors T1 and T2 are of NPN configuration as shown in FIG. 2. The differential amplifier could be easily adapted for PNP type transistors. Transistor T1 has a collector 10, base 11 and emitter 12 while transistor T2 has a collector 15, base 14 and emitter 13 which is connected in common with emitter 12 of transistor T1. Transistors T1 and T2 are fed from a closely regulated D.C. supply P with positive terminal 20 connected between collector resistors R3 and R4 at common connection point 21. Common emitters 12 and 13 of transistors T1 and T2 are connected to the negative terminal 24 of D.C. supply P. Positive terminal 22 of D.C. supply P is connected to resistors R5 and R6 at common junction point 25 with resistors R5 and R6 connected in turn in series with base 11 and base 14 of transistors T1 and T2 respectively. Diodes D1 and D2 are connected in back to back configuration between base 11 and base 14 of transistors T1 and T2.

Collector 10 of transistor T1 is connected through resistor R9 to the base of transistor T3 of amplifier F1 shown blocked off with dotted lines in FIG. 2 while collector 15 of transistor T2 is connected through resistor R10 to the base of transistor T4 of amplifier F2 also shown blocked off with dotted lines in FIG. 2. Amplifiers F1 and F2 are identical. Amplifier F1 includes transistors T3 and T5 while amplifier F2 includes transistors T4 and T6. The emitter of transistor T3 is connected to the base of transistor T5 while the emitter of transistor T4 is connected to the base of transistor T6. This is known to the art as a Darlington configuration. The collector of transistor T3 is connected through resistor R11 to conductor 26. Conductor 26 is also connected to the collector of transistor T5, the collector of transistor T6 and through resistor R20 to the positive terminal 30 of regulated D.C. supply P2. The collector of transistor T4 is also connected to conductor 26 by means of resistor R12. The negative terminal 32 of D.C. supply P2 is connected to conductor 28 which connects to the emitters of transistors T3, T5, T6 and T4 by means of resistors R13, R14, R15 and R16 respectively. Junction point 33 on conductor 28 is connected to junction point 35 connecting in common one end of resistors R7 and R8, the other end of resistor R7 being connected to collector 10 of transistor T1 and the other end of resistor R8 being connected to collector 15 of transistor T2. Junction point 33 is also connected to junction point 37 of the bridge network K.

Output 40 of the amplifier F1 is connected to the base 44 of drive transistor T7 of bridge network K while output 42 of amplifier F2 is connected to the base 46 of drive transistor T8 of bridge network K. Bridge network K is composed of two symmetrically balanced arms A1 and A2 with each arm comprising a switching transistor T9 and T10 and a drive transistor T7 and T8 respectively. Although a pair of transistors are used in each arm respectively the invention is not to be considered limited thereto for other semiconductor devices can be used in combination to function in the same manner in bridge network K and are considered to be within the scope of the invention. The emitters of drive transistors T7 and T8 are joined at junction 37 which is in turn connected to the negative terminal 50 of regulated D.C. supply P3. Positive terminal 52 of regulated D.C. supply P3 connects the collectors of switching transistors T9 and T10 in common. The emitter 60 of switching transistor T9 is in series through a parallel combination of Zener diode ZD2 and resistor R20 to collector 62 of drive transistor T7. Zener diode ZD2 has its cathode connected to the emitter 60 of switching transistor T9 and its anode connected to collector 62 of drive transistor T7. The emitter 63 of switching transistor T10 is in series through the parallel combination of Zener diode ZD3 and resistor R21 to the collector 64 of drive transistor T8. Zener diode ZD3 has its cathode connected to emitter 63 of switching transistor T10 and its anode connected to collector 64 of drive transistor T8. A D.C. bias supply P4 feeds switching transistor T9 with its positive terminal 65 connected to the base of switching transistor T9 and its negative terminal 66 connected to junction point 70. Zener diode ZD1 is connected across D.C. bias supply P4. A separate D.C. bias supply P5 feeds switching transistor T10 with its positive terminal 68 connected to the base of switching transistor T10 and its negative terminal 67 connected to junction point 72. Zener diode ZD4 is connected across D.C. bias supply P5.

The load circuit which for arc voltage control is a D.C. servo motor M is connected across arms A1 and A2 of bridge network K to emitters 60 and 63 of switching transistors T9 and T10 respectively.

Operation

Referring to FIGS. 1 and 2, the differential amplifier L utilizes a pair of semiconductor silicon transistors T1 and T2 which are operated class A and fed from a closely regulated D.C. supply P. Resistor R5 and R6 in combination with back to back diodes D1 and D2 from a protective circuit for transistors T1 and T2 limiting the input error signal to the forward voltage drop upon either diode depending upon the polarity of the error signal. Transistors T1 and T2 are forward biased drawing equal current from regulated D.C. supply P through collector resistors R3 and R4 respectively. With collector resistors R3 and R4 identical, collector 10 of transistor T1 is at the same potential as collector 15 of transistor T2. Collectors 10 and 15 are connected as inputs to amplifiers F1 and F2 respectively. Amplifiers F1 and F2 are current amplifiers of conventional design. A positive rise in potential at collector 10 or 15 is reflected as a large increase in current in transistor T5 or T6 respectively. A small drop in potential at collector 10 or 15 is reflected as a negative bias to transistors T5 or T6 respectively.

With zero error signal between terminals A and C of FIG. 1 the output of the differential amplifier L is zero. Current drawn through transistors T5 and T6 of amplifiers F1 and F2 are insufficient to maintain drive transistors T7 and T8 of bridge network K in a conducting state. With drive transistors T7 and T8 in a non-conducting state, no collector current will flow through switching transistors T9 and T10. In this condition, switching transistors T9 and T10 are in a quiescent or "primed state" with base current being supplied therethrough from D.C. bias supply P4 and P5. Bias or base current flows from the positive terminal 65 of D.C. bias supply P4 through the base to emitter of switching transistor T9, through resistor R20 and back to the negative terminal 66 of the bias supply P4. An identical bias current is established from D.C. bias supply P5 through switching transistor T10 and resistor R21. Zener diodes ZD2 and ZD3 are chosen with avalanche breakdown voltages equal to or slightly greater than the D.C. bias supply voltage for transistors T9 and T10. Accordingly, approximately zero current flows through the Zener diodes ZD2 and ZD3 under zero signal error voltage conditions. D.C. bias supply P4 and P5 may represent batteries of equal magnitude or form part of a regulated transformer power supply with two isolated outputs. In the latter case, Zener diodes ZD1 and ZD4 connected thereacross may represent part of the regulated supply. The Zener diodes ZD1 and ZD4 assist in maintaining a constant bias voltage across switching transistors T9 and T10 but primarily serve the function of providing a path for dynamically braking the D.C. servo motor M as will be discussed hereinafter.

An error signal develops when the arc voltage across terminals C and D of FIG. 1 varies from the D.C. reference source voltage across terminals A and B. Where the arc voltage increases with respect to the reference voltage terminal A is rendered negative with respect to terminal C. When the arc voltage decreases with respect to the reference voltage terminal A is rendered positive with respect to terminal C. In the former situation with terminal A negative with respect to terminal C the differential amplifier unbalances causing collector 10 of transistor T1 to rise in potential while collector 15 of transistor T2 decreases in potential. The increase in potential at collector 10 is reflected as a large increase in current in transistor T5 of amplifier F1. The decrease in potential at collector 15 is reflected as a negative bias upon transistor T6 of amplifier F2. Junction point 33 is a common reference point for amplifiers F1 and F2. The increase in current drawn through transistor T5 of amplifier F1 increases proportionally, the base current to drive transistor T7 of bridge network K rendering it highly conductive. Once conducting, collector current drawn therethrough must flow through Zener diode ZD2 increasing the reverse voltage thereacross until the Zener breakdown voltage is reached. The reverse breakdown voltage across Zener diode ZD2 turns off switching transistor T9. The collector current is therefore entirely supplied by switching transistor T10 completing an electrical path from the positive terminal 52 of D.C. supply P3, through the collector to emitter of switching transistor T10, through D.C. servo motor M, Zener diode ZD2, the collector to emitter of drive transistor T7 and back to the negative terminal 50 of the D.C. power supply P3. The magnitude of the current drawn through the motor M from switching transistor T10 will depend upon the magnitude of the forward bias current supplied to drive transistor T7. Resistor R20 in series with regulated D.C. supply P2 limits the magnitude of the current that can be developed in either transistor T5 or T6. Drive transistor T8 remains in a non-conducting state due to the negative bias upon transistor T6 of amplifier F2.

Should the error signal be of opposite polarity i.e. the voltage at A positive with respect to the voltage at C in FIG. 1, then collector 10 of transistor T1 will decrease in potential while collector 15 of transistor T2 will increase in potential. This will cause an exact opposite condition to exist in bridge network K where drive transistors T8 will be placed in a highly conductive state due to an increased supply of forward biasing current from transistor T6 of amplifier F2 while drive transistor T7 will be rendered non-conductive due to the negative bias upon transistor T5 of amplifier F1. The collector current drawn through drive transistor T8 will be supplied from switching transistor T9 through the D.C. servo motor M and Zener diode ZD3. The reverse voltage across Zener diode ZD3 will switch off switching transistor T10. Therefore, the D.C. servo motor M will rotate in a direction determined by the direction of current supplied therethrough which in turn depends upon which drive transistor T7 or T8 is rendered conductive. Rotation of D.C. servo motor M results in a linear movement of torch T toward or away from work W varying the voltage across the arc, which is the voltage appearing at terminals C and D in FIG. 1, until the error voltage is reduced to zero.

The motor M as it builds up speed generates a voltage across itself. For the motor M to respond rapidly to a reversal in the polarity of the error signal, the generated voltage must be dissipated rapidly to permit a build up in the reverse direction. The moment the error signal voltage passes the zero condition a null exists. The drive transistors T7 and T8 return to a non-conducting state due to insufficient forward bias current while the switching transistors T9 and T10 return to their primed state delivering only quiescent current through their biasing circuits as discussed heretofore. At this instant the motor will see for all practical purposes a short circuit thereacross permitting almost instaneous deenergization of the generated voltage. The short circuit is provided with the assistance of Zener diodes ZD1 and ZD4. If the generated voltage across the motor is positive at motor terminal 75 with respect to motor terminal 77, it will see an electrical path of extremely low resistance provided by resistor R20 and Zener diode ZD2 in parallel combination, Zener diode ZD1, the base to collector of switching transistor T9, and the collector to emitter of switching transistor T10. If terminal 77 of the motor is positive with respect to terminal 75, the motor voltage will see the equivalent low resistance path provided by resistor R21 and ZD3 in parallel combination, Zener diode ZD4, the base to collector of switching transistor T10 and the collector to emitter of switching transistor T9. Therefore, the motor automatically dynamically brakes itself as soon as the error signal passes the zero or null condition. This minimizes overshoot and any tendency to generate oscillations.

Although the transistorized control possesses a high sensitivity it is substantially insensitive to error signals erroneouly produced by large spurious noise pulses of short time duration. This results from the fact that the magnitude of the current supplied to the D.C. servo motor M is proportional to the instantaneous magnitude of the error signal. Therefore, the current to the servo motor M will possess the same short time duration as the error signal which in most instances is too short to develop a motor response.

The transistorized control of this invention may also be used to control arc voltage or arc current during MIG welding or provide if necessary slope control. Here the drive shaft of the D.C. servo motor would be coupled within the D.C. welding power supply to a brush slide mechanism to vary the voltage or current delivered to the arc.

What is claimed is:

1. Arc welding control apparatus for maintaining any one of a plurality of predetermined welding conditions by continuously comparing a preset constant reference signal voltage representing said predetermined welding condition with a variable signal voltage representing the actual welding condition to produce an error voltage equivalent to the difference between the two signal voltages and applying said error voltage to a transistorized control system which comprises: a transistorized differential amplifier connected to receive said error voltage; a balanced bridge network including two arms connected in parallel with a series source of energizing potential, said arms being symmetrically disposed about a load circuit with each arm comprising semi-conductor switch means in a normally quiescent state and semi-conductor drive means, the load circuit being connected between the switch means and drive means of each arm; each drive means being connected to the output of said differential amplifier such that for a given amplifier output polarity one of said drive means is rendered conductive and the other of said drive means is rendered non-conductive, said conductive drive means including means for switching off the switch means in the arm associated therewith and for establishing a current path for direct current flow from the other switch means in the arm opposite thereto, through the load circuit and through said conductive drive means; whereby when the polarity of the amplifier output changes, the direction of current through the load circuit automatically reverses; and wherein said load circuit includes means responsive to the direction of current flow therethrough for adjusting the variable signal voltage to continuously reduce the error voltage to zero.

2. A control circuit according to claim 1 wherein each semi-conductor switch means is a forward biased transistor each having a base, collector and emitter, with the collectors connected in common and the emitter of each transistor connected in series with the semi-conductor drive means in the arm associated therewith; and wherein the load circuit is connected to each emitter for receiving substantially no direct current therethrough when said differential amplifier output is zero and for receiving current therethrough from only one of said switch means when each of said drive means receives an input signal from the amplifier output.

3. A control circuit according to claim 2 wherein each of said drive means is a transistor having a base, emitter and collector with each base connected to the output of said differential amplifier; and wherein the collector of each drive transistor is connected in series to the emitter of each switching transistor in the arm of the bridge network associated therewith through a Zener diode; each Zener diode being connected to receive reverse current flow therethrough when the drive transistor in series therewith is rendered conductive to switch to an off condition the switching transistor in the arm associated therewith.

4. A control circuit according to claim 1 wherein the load includes a D.C. motor with current flowing therethrough in a direction determined by whichever drive means is rendered conductive.

References Cited

UNITED STATES PATENTS

| | | | |
|---|---|---|---|
| 3,054,924 | 9/1962 | Wetzger et al. | 318—333 X |
| 3,110,851 | 11/1963 | Plogstedt et al. | 318—257 X |
| 3,260,912 | 7/1966 | Gregory | 318—341 |
| 3,378,102 | 4/1968 | Collin et al. | 318—28 X |
| 3,378,739 | 4/1968 | Livengood et al. | 318—18 |

ANTHONY BARTIS, Primary Examiner

C. L. ALBRITTON, Assistant Examiner

U.S. Cl. X.R.

323—22